US010771753B2

(12) United States Patent
Qian et al.

(10) Patent No.: US 10,771,753 B2
(45) Date of Patent: Sep. 8, 2020

(54) CONTENT PRESENTATION METHOD, CONTENT PRESENTATION MODE PUSH METHOD, AND INTELLIGENT TERMINAL

(71) Applicant: Huawei Technologies Co., Ltd., Shenzhen (CN)

(72) Inventors: Li Qian, Shenzhen (CN); Shanfu Li, Shenzhen (CN); Jiali Fu, Shenzhen (CN); Kangmin Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 15/273,962

(22) Filed: Sep. 23, 2016

(65) Prior Publication Data
US 2017/0013241 A1 Jan. 12, 2017

Related U.S. Application Data
(63) Continuation of application No. PCT/CN2014/090444, filed on Nov. 6, 2014.

(30) Foreign Application Priority Data
Mar. 24, 2014 (CN) .......................... 2014 1 0112107

(51) Int. Cl.
H04N 9/31 (2006.01)
G06F 3/14 (2006.01)
(Continued)

(52) U.S. Cl.
CPC ............ H04N 9/3194 (2013.01); G03H 1/04 (2013.01); G06F 3/14 (2013.01); G06K 9/00624 (2013.01);
(Continued)

(58) Field of Classification Search
CPC . G06F 3/14; G03H 1/04; H04N 19/52; H04N 19/577; H04N 19/176; H04N 19/82;
(Continued)

(56) References Cited

U.S. PATENT DOCUMENTS
2001/0056471 A1    12/2001  Negishi et al.
2009/0278828 A1*  11/2009  Fletcher .............. G06F 1/3203
                                                    345/207
(Continued)

FOREIGN PATENT DOCUMENTS
CN    102263860 A    11/2011
CN    102955664 A     3/2013
(Continued)

OTHER PUBLICATIONS
Machine Translation and Abstract of Chinese Publication No. CN102955664, Mar. 6, 2013, 11 pages.
(Continued)

Primary Examiner — Richard T Torrente
(74) Attorney, Agent, or Firm — Conley Rose, P.C.

(57) ABSTRACT
A content presentation method, a content presentation mode push method, and an intelligent terminal are used to intelligently present content to a user in different presentation modes according to different identified scenarios. The method includes acquiring, by an intelligent terminal, context data of a user, identifying a user use scenario according to the context data, determining a first presentation mode corresponding to the user use scenario, and presenting content to the user in the first presentation mode. In this way, the intelligent terminal can intelligently present the content to the user in different presentation modes according to different scenarios, thereby meeting a requirement of the user for a content presentation mode in different environments.

8 Claims, 7 Drawing Sheets

(51) Int. Cl.
*G06K 9/00* (2006.01)
*G03H 1/04* (2006.01)
*G06K 9/62* (2006.01)
*G03H 1/22* (2006.01)

(52) U.S. Cl.
CPC ....... *G06K 9/00664* (2013.01); *G06K 9/6289* (2013.01); *G03H 1/2294* (2013.01); *G09G 2354/00* (2013.01)

(58) Field of Classification Search
CPC .. H04N 19/156; H04N 19/132; H04N 19/117; H04N 19/147; H04N 19/159; H04N 19/139; H04N 19/105; H04N 19/70; H04N 19/537; H04N 19/61; H04N 19/46; H04N 19/56; H04N 19/573
USPC .......................................................... 348/40
See application file for complete search history.

(56) References Cited

U.S. PATENT DOCUMENTS

| | | | |
|---|---|---|---|
| 2013/0044215 | A1 | 2/2013 | Rothkopf et al. |
| 2014/0188873 | A1* | 7/2014 | Chang ..................... G06F 16/29 707/736 |
| 2015/0156307 | A1* | 6/2015 | Kim .................. H04W 52/0261 455/566 |

FOREIGN PATENT DOCUMENTS

| | | |
|---|---|---|
| CN | 103227846 A | 7/2013 |
| CN | 103338139 A | 10/2013 |
| CN | 103942021 A | 7/2014 |

OTHER PUBLICATIONS

Machine Translation and Abstract of Chinese Publication No. CN103227846, Jul. 31, 2013, 7 pages.
Machine Translation and Abstract of Chinese Publication No. CN103942021, Part 1, Jul. 23, 2014, 10 pages.
Machine Translation and Abstract of Chinese Publication No. CN103942021, Part 2, Jul. 23, 2014, 3 pages.
Foreign Communication From a Counterpart Application, Chinese Application No. 201410112107.5, Chinese Office Action dated Nov. 21, 2016, 7 pages.
Foreign Communication From a Counterpart Application, PCT Application No. PCT/CN2014/090444, English Translation of International Search Report dated Feb. 4, 2015, 2 pages.
Foreign Communication From a Counterpart Application, PCT Application No. PCT/CN2014/090444, English Translation of Written Opinion dated Feb. 4, 2015, 17 pages.
Machine Translation and Abstract of Chinese Publication No. CN102263860, Nov. 30, 2011, 11 pages.
Foreign Communication From a Counterpart Application, Chinese Application No. 201410112107.5, Chinese Office Action dated Oct. 11, 2017, 6 pages.

\* cited by examiner

CONTENT PRESENTATION METHOD, CONTENT PRESENTATION MODE PUSH METHOD, AND INTELLIGENT TERMINAL

CROSS-REFERENCE TO RELATED APPLICATIONS

This application is a continuation of International Application No. PCT/CN2014/090444, filed on Nov. 6, 2014, which claims priority to Chinese Patent Application No. 201410112107.5, filed on Mar. 24, 2014, both of which are hereby incorporated by reference in their entireties.

TECHNICAL FIELD

The present disclosure relates to the field of display control, and in particular, to a content presentation method, a content presentation mode push method, and an intelligent terminal.

BACKGROUND

As science and technology develop rapidly, intelligent terminals are more widely used. Besides cell phones, tablet computers, and the like, more types of intelligent terminals begin to emerge, for example, wearable devices such as GOOGLE GLASS and a SAMSUNG GEAR smartwatch. To enable a user to conveniently obtain more information, an intelligent terminal generally has a display function.

Currently, an intelligent terminal may present content to a user in different presentation modes, for example, by a screen display or projection display and by a voice broadcast.

However, currently an intelligent terminal can present content to a user in a specific presentation mode only selection by the user. When a presentation mode of the intelligent terminal cannot conveniently enable, in a current scenario, the user to acquire required information, for example, when light is relatively strong, which prevents the user from clearly seeing content on a screen, the user needs to modify the presentation mode to select a more suitable content presentation mode in the current scenario, and a requirement of the user for a content presentation mode in the current scenario may be difficult to be met after multiple times of switching. As a result, operations and a time that are required by the user to acquire the information are increased, and efficiency of acquiring the information by the user is reduced.

SUMMARY

Embodiments of the present disclosure provide a content presentation method, a content presentation mode push method, and an intelligent terminal, which are used to intelligently present content to a user in different presentation modes according to different identified scenarios, which better meets a requirement of the user for a content presentation mode in the different scenarios.

A first aspect of the embodiments of the present disclosure provides a content presentation method, including acquiring, by an intelligent terminal, context data of a user, identifying, by the intelligent terminal, a user use scenario according to the context data, where the user use scenario is used to indicate a scene in which the user currently uses an intelligent device, determining, by the intelligent terminal, a first presentation mode, which corresponds to the user use scenario, of a presentation mode, where the presentation mode indicates a content presentation mode, and presenting, by the intelligent terminal, content to the user in the first presentation mode.

With reference to the first aspect of the embodiments of the present disclosure, in a first implementation manner of the first aspect of the embodiments of the present disclosure, the acquiring, by an intelligent terminal, context data includes when the intelligent terminal detects that content needs to be presented, acquiring the context data of the user.

With reference to the first aspect of the embodiments of the present disclosure, in a second implementation manner of the first aspect of the embodiments of the present disclosure, before the step of acquiring, by an intelligent terminal, context data, the method includes presenting, by the intelligent terminal, the content to the user in a second presentation mode, and the identifying, by the intelligent terminal, a user use scenario according to the context data includes determining, by the intelligent terminal, whether the context data changes compared with context data acquired in a previous acquiring cycle, and if the context data changes, identifying, by the intelligent terminal, the user use scenario according to the context data.

With reference to any one of the first aspect to the second implementation manner of the first aspect of the embodiments of the present disclosure, in a third implementation manner of the first aspect of the embodiments of the present disclosure, the identifying, by the intelligent terminal, a user use scenario according to the context data includes searching, by the intelligent terminal, for scenario configuration information, to obtain the user use scenario corresponding to the context data, where the scenario configuration information includes a correspondence between a context data threshold range and the user use scenario.

With reference to the first aspect of the embodiments of the present disclosure, in a fourth implementation manner of the first aspect of the embodiments of the present disclosure, the acquiring context data includes invoking a light sensor to detect light intensity, and/or invoking a camera to detect a surrounding medium available for projection, and/or invoking a microphone to detect intensity of use environment noise, and/or invoking a motion sensor to detect moving state data of the user, and/or invoking a global positioning system (GPS) or Wireless Fidelity (WiFi) to identify current location information, and/or invoking a battery management unit to detect a current battery level.

A second aspect of the embodiments of the present disclosure provides a content presentation mode push method, including acquiring, by an intelligent terminal, context data of a user, identifying, by the intelligent terminal, a user use scenario according to the context data, where the user use scenario is used to indicate a scene in which the user currently uses an intelligent device, determining, by the intelligent terminal, a corresponding presentation mode of the user use scenario, where the corresponding presentation mode includes at least one presentation mode, and the presentation mode indicates a content presentation mode, and pushing, by the intelligent terminal, the corresponding presentation mode to the user, so that the user selects a presentation mode from the pushed corresponding presentation mode to perform content presentation.

With reference to the second aspect of the embodiments of the present disclosure, in a first implementation manner of the second aspect of the embodiments of the present disclosure, after the step of pushing, by the intelligent terminal, the corresponding presentation mode to the user, the method further includes detecting, by the intelligent terminal, whether the user chooses to use the corresponding presentation mode, and if the user chooses to use at least one presentation mode of the corresponding presentation mode, presenting, by the intelligent terminal, content to the user in the presentation mode that the user chooses to use, or if the user chooses not to use the corresponding presentation mode, presenting, by the intelligent terminal, content to the user in a default presentation mode.

With reference to the first implementation manner of the second aspect of the embodiments of the present disclosure, in a second implementation manner of the second aspect of the embodiments of the present disclosure, the determining, by the intelligent terminal, a corresponding presentation mode of the user use scenario includes searching, by the intelligent terminal, for a preset rule policy, to obtain the corresponding presentation mode of the user use scenario, where the preset rule policy is used to indicate a correspondence between the user use scenario and the presentation mode.

With reference to the second implementation manner of the second aspect of the embodiments of the present disclosure, in a third implementation manner of the second aspect of the embodiments of the present disclosure, after the step of detecting, by the intelligent terminal, whether the user chooses to use the corresponding presentation mode, the method further includes recording, by the intelligent terminal, the presentation mode that the user chooses to use in the user use scenario, and updating, by the intelligent terminal to the preset rule policy, a correspondence between the user use scenario and the presentation mode that the user chooses to use.

A third aspect of the embodiments of the present disclosure provides an intelligent terminal, including an acquiring module configured to acquire context data of a user, a scenario identification module configured to identify a user use scenario according to the context data acquired by the acquiring module, where the user use scenario is used to indicate a scene in which the user currently uses an intelligent device, a presentation determining module configured to determine a first presentation mode, which corresponds to the user use scenario identified by the scenario identification module, of a presentation mode, where the presentation mode indicates a content presentation mode, and a content presentation module configured to present content to the user in the first presentation mode determined by the presentation determining module.

With reference to the third aspect of the embodiments of the present disclosure, in a first implementation manner of the third aspect of the embodiments of the present disclosure, the acquiring module is configured to when it is detected that content needs to be presented, acquire the context data of the user.

With reference to the third aspect of the embodiments of the present disclosure, in a second implementation manner of the third aspect of the embodiments of the present disclosure, the intelligent terminal further includes a pre-presentation module configured to present the content to the user in a second presentation mode, and the scenario identification module includes a change judgment module configured to determine whether the context data acquired by the acquiring module changes compared with context data acquired in a previous acquiring cycle, and an identification unit configured to when the change judgment module determines that the context data changes compared with the context data acquired in the previous acquiring cycle, identify the user use scenario according to the context data acquired by the acquiring module, where the user use scenario is used to indicate the scene in which the user currently uses the intelligent device.

With reference to any one of the third aspect to the second implementation manner of the third aspect of the embodiments of the present disclosure, in a third implementation manner of the third aspect of the embodiments of the present disclosure, the scenario identification module is configured to search for scenario configuration information, to obtain the user use scenario corresponding to the context data, where the scenario configuration information includes a correspondence between a context data threshold range and the user use scenario.

With reference to the third aspect of the embodiments of the present disclosure, in a fourth implementation manner of the third aspect of the embodiments of the present disclosure, the acquiring module includes a light sensor configured to detect light intensity, and/or a camera configured to detect a surrounding medium available for projection, and/or a microphone configured to detect intensity of use environment noise, and/or a motion sensor configured to detect moving state data of the user, and/or a GPS configured to identify current location information, and/or a battery management unit configured to detect a current battery level.

A fourth aspect of the embodiments of the present disclosure provides an intelligent terminal, including an acquiring module configured to acquire context data of a user, a scenario identification module configured to identify a user use scenario according to the context data acquired by the acquiring module, where the user use scenario is used to indicate a scene in which the user currently uses an intelligent device, a mode determining module configured to determine a corresponding presentation mode of the user use scenario, where the corresponding presentation mode includes at least one presentation mode, and the presentation mode indicates a content presentation mode, and a push module configured to push the corresponding presentation mode to the user, so that the user selects a presentation mode from the pushed corresponding presentation mode to perform content presentation.

With reference to the fourth aspect of the embodiments of the present disclosure, in a first implementation manner of the fourth aspect of the embodiments of the present disclosure, the intelligent terminal further includes a detection module configured to detect whether the user chooses to use the corresponding presentation mode, a selective presentation module configured to when the user chooses to use at least one presentation mode of the corresponding presentation mode, present content to the user in the presentation mode that the user chooses to use, and a default presentation module configured to when the user chooses not to use the corresponding presentation mode, present content to the user in a default presentation mode.

With reference to the first implementation manner of the fourth aspect of the embodiments of the present disclosure, in a second implementation manner of the fourth aspect of the embodiments of the present disclosure, the mode determining module is configured to search a preset rule policy, to obtain the corresponding presentation mode of the user use scenario, where the preset rule policy is used to indicate a correspondence between the user use scenario and the presentation mode, the corresponding presentation mode includes the at least one presentation mode, and the presentation mode indicates the content presentation mode.

With reference to the second implementation manner of the fourth aspect of the embodiments of the present disclosure, in a third implementation manner of the fourth aspect of the embodiments of the present disclosure, the intelligent terminal further includes a recording module configured to record the presentation mode that the user chooses to use in the user use scenario, and an update module configured to update, to the preset rule policy, a correspondence between the user use scenario and the presentation mode that is recorded by the recording module and that the user chooses to use.

It can be seen from the foregoing technical solutions that the embodiments of the present disclosure have the following advantages in the embodiments of the present disclosure, an intelligent terminal acquires context data of a user, identifies a user use scenario according to the context data, determines a first presentation mode corresponding to the user use scenario, and presents content to the user in the first presentation mode. In this way, the intelligent terminal can intelligently present the content to the user in different presentation modes according to different scenarios, thereby meeting a requirement of the user for a content presentation mode in different environments. The intelligent terminal can identify a current scenario according to the acquired context data, and then directly present the content to the user in the corresponding first presentation mode, thereby reducing operations and a time that are required by the user to acquire information, increasing a rate of acquiring the information, and improving user experience.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

Figure 1:
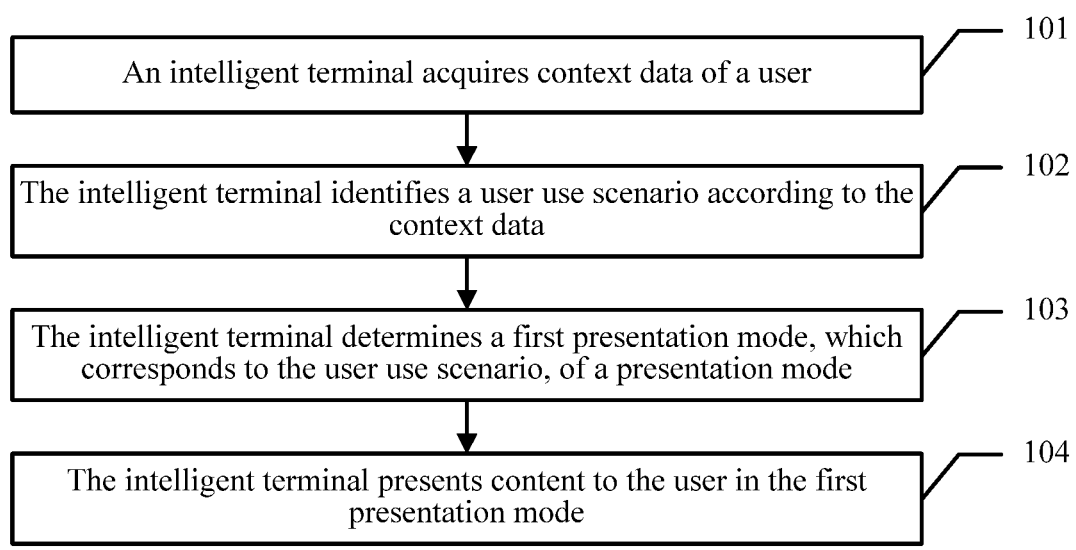
FIG. 1 is a schematic flowchart of a content presentation method according to an embodiment of the present disclosure.

Referring to FIG. 1, an embodiment of a content presentation method in the embodiments of the present disclosure includes:

101: An intelligent terminal acquires context data of a user.

When the intelligent terminal is in a powered-on state, the intelligent terminal can acquire the context data of the user.

102: The intelligent terminal identifies a user use scenario according to the context data.

After the intelligent terminal acquires the context data, the intelligent terminal identifies the user use scenario according to the context data, where the user use scenario is used to indicate a scene in which the user currently uses an intelligent device.

103: The intelligent terminal determines a first presentation mode, which corresponds to the user use scenario, of a presentation mode.

After identifying the user use scenario, the intelligent terminal determines the first presentation mode, which corresponds to the use scenario, of the presentation mode, where the presentation mode indicates a content presentation mode.

It may be understood that, the presentation mode may include a mode that can be used to present content, such as screen switching, switching to large screen display, projection display, holographic display, and voice broadcast, which is not limited herein.

104: The intelligent terminal presents content to the user in the first presentation mode.

After determining the first presentation mode corresponding to the user use scenario, the intelligent terminal presents the content to the user in the first presentation mode.

In this embodiment of the present disclosure, an intelligent terminal acquires context data of a user, identifies a user use scenario according to the context data, determines a first presentation mode corresponding to the user use scenario, and presents content to the user in the first presentation mode. In this way, the intelligent terminal can intelligently present the content to the user in different presentation modes according to different scenarios, thereby meeting a requirement of the user for a content presentation mode in different environments, and the intelligent terminal can identify a current scenario according to the acquired context data, and then directly present the content to the user in the corresponding first presentation mode, thereby reducing operations and a time that are required by the user to acquire information, increasing a rate of acquiring the information, and improving user experience.

Figure 2:
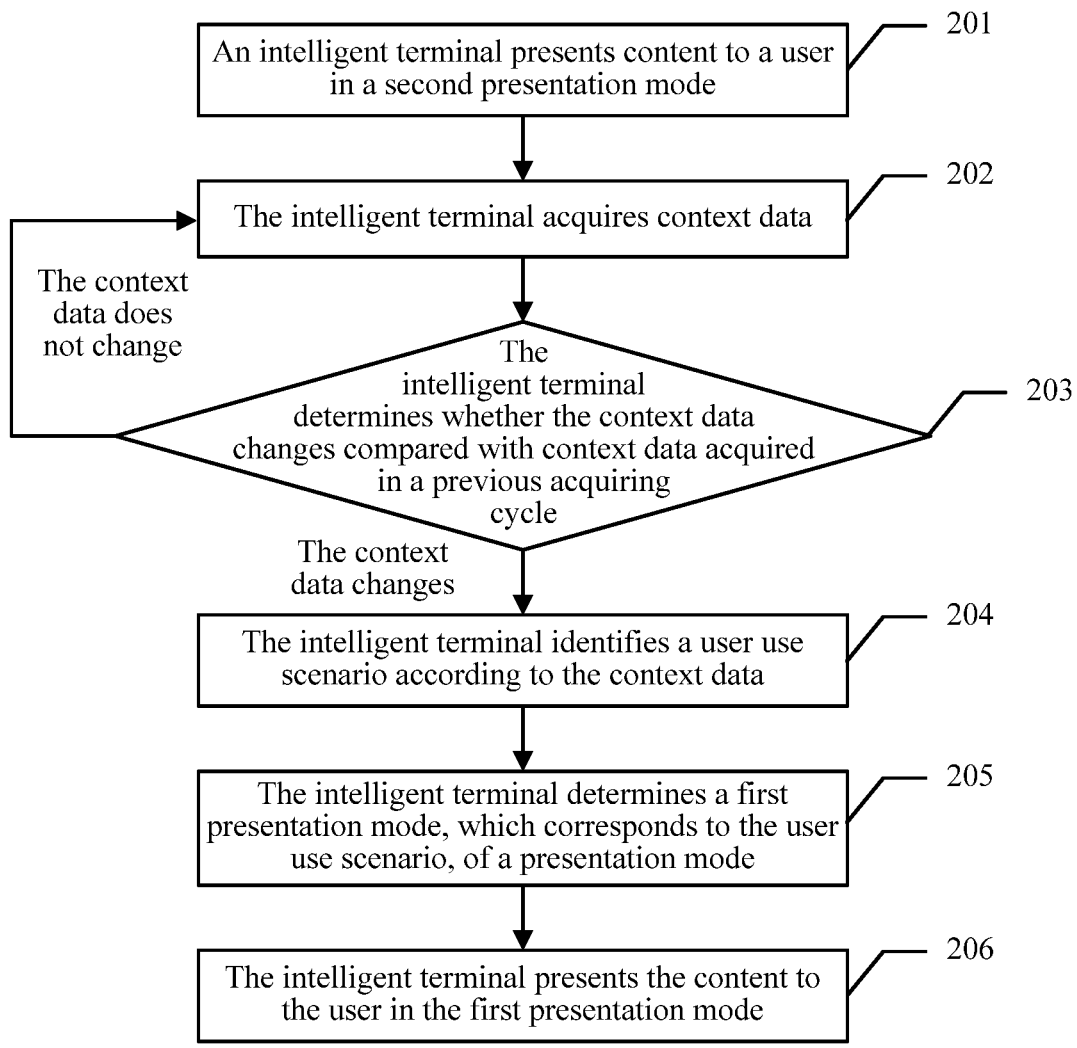
FIG. 2 is another schematic flowchart of a content presentation method according to an embodiment of the present disclosure.

In an actual application, an intelligent terminal may present content to a user in a second presentation mode in advance, and after acquiring context data, determine whether the context data changes compared with context data acquired in a previous acquiring cycle, and then perform a subsequent operation. Referring to FIG. 2, another embodiment of a content presentation method in the embodiments of the present disclosure includes:

201: An intelligent terminal presents content to a user in a second presentation mode.

When content needs to be presented or the user is presenting the content in the second presentation mode, the intelligent terminal may present the content to the user in the second presentation mode.

202: The intelligent terminal acquires context data of the user.

When the intelligent terminal presents the content to the user in the second presentation mode, the intelligent terminal may acquire the context data of the user.

The context data may also be referred to as context information, and refers to information such as a history record of a location, an action, and a behavior of the user. The context data may be obtained from various pieces of source information, for example, a light sensor may be invoked to detect light intensity, a camera may be invoked to detect a surrounding medium available for projection, a microphone may be invoked to detect intensity of use environment noise, a motion sensor may be invoked to detect moving state data of the user, a global positioning system GPS or Wireless Fidelity WiFi may be invoked to identify location information of a current user, or a battery management unit may be invoked to detect a current battery level, which is not limited herein.

In summary, the context data reflects some attribute information related to the user.

The intelligent terminal may be set to acquire the context data once at a specific interval, a preset condition may be set to trigger acquisition of the context data, or the context data may be continuously acquired, which is not limited herein.

It may be understood that, in step 201 and step 202, the intelligent terminal first presents the content to the user in the second presentation mode, and then acquires the context data. In an actual application, the intelligent terminal may first not present the content in a presentation mode, and may directly acquire the context data when detecting that content needs to be presented, and then perform a subsequent operation according to the context data.

203: The intelligent terminal determines whether the context data changes compared with context data acquired in a previous acquiring cycle.

After acquiring the context data, the intelligent terminal determines whether the context data changes compared with the data acquired in the previous acquiring cycle, and if the context data changes, step 204 is triggered, or if the context data does not change, step 202 is triggered.

It may be understood that, if the intelligent terminal has acquired context data before currently acquiring context data, and in this case, the intelligent terminal determines the second presentation mode according to the context data acquired last time or context data that is the same as the context data acquired last time, the intelligent terminal may determine whether the currently acquired context data changes compared with the context data acquired last time, if the intelligent terminal has not acquired context data before currently acquiring context data, for example, the second presentation mode is a default presentation mode, the intelligent terminal may be set to directly determine that the currently acquired context data is different from the context data acquired in the previous acquiring cycle, or may be set to obtain another determining result, which is not limited herein.

If the intelligent terminal determines that the context data does not change compared with the context data acquired in the previous acquiring cycle, the intelligent terminal may also wait for a preset time, and then step 202 is triggered, which is not limited herein.

204: The intelligent terminal identifies a user use scenario according to the context data.

When the intelligent terminal acquires the context data, and determines that the context data is different from the context data acquired in the previous acquiring cycle, the intelligent terminal identifies the user use scenario according to the context data, where the user use scenario is used to indicate a scene in which the user currently uses an intelligent device.

There are many manners in which the intelligent terminal identifies a user use scenario according to context data. The intelligent terminal may search for scenario configuration information, to obtain a user use scenario corresponding to the context data, where the scenario configuration information includes a correspondence between a context data threshold range and the user use scenario, the intelligent terminal may identify a user use scenario in a machine learning manner, for example, establish a corresponding scenario model M for each scenario A by using a specific quantity of training data sets, including data acquired from a context data source, and a current user use scenario, when a set of data S is acquired from the context data source, S is entered into the model M, and output of M is determining whether the use scenario is the scenario A, and further, by continuously acquiring context data and user use scenario information, the intelligent terminal may learn to update a scenario model, or the intelligent terminal may search for other information, to obtain the user use scenario corresponding to the context data, which is not limited herein.

The user use scenario may include a scenario that can be identified according to the context data, for example, a battery level being insufficient, a surrounding environment being noisy, moving outdoors, or being static outdoors, which is not limited herein.

205: The intelligent terminal determines a first presentation mode, which corresponds to the user use scenario, of a presentation mode.

After identifying the user use scenario, the intelligent terminal determines the first presentation mode, which corresponds to the use scenario, of the presentation mode, where the presentation mode indicates a content presentation mode.

It should be noted that, the presentation mode may include a mode that can be used to present content, such as screen switching, switching to large screen display, projection display, holographic display, and voice broadcast, which is not limited herein.

There are multiple methods for the intelligent terminal to determine the first presentation mode corresponding to the user use scenario. The intelligent terminal may search a preset rule policy, to obtain the first presentation mode corresponding to the user use scenario. There may be multiple user use scenarios identified by the intelligent terminal according to the context data. Therefore, policies in the preset rule policy may have different priorities. The intelligent terminal performs sequential matching between multiple identified user use scenarios and the preset rule policy according to the priorities in sequence. When one user use scenario thereof succeeds in matching, the intelligent terminal may use a presentation mode corresponding to the user use scenario as the first presentation mode. For example, a preset rule policy is shown in the following Table 1, where a policy with a relatively small sequence number has a relatively high priority:

TABLE 1

| Sequence number | User use scenario | Presentation mode |
|---|---|---|
| 1 | Battery level being insufficient | Screen presentation |
| 2 | Surrounding environment being noisy | Screen presentation |
| 3 | Outdoors, Moving | Voice broadcast |
| 4 | Outdoors, Being static | Screen presentation |
| 5 | Indoors, Detecting a surrounding large screen display device | Sending content to the large screen display device |
| 6 | Indoors, Moving | Voice broadcast |
| 7 | Indoors, Being static Detecting that there is a surrounding medium available for projection | Projection display |
| 8 | Indoors, Being static Detecting that there is no surrounding medium available for projection | Holographic display |
| ... | ... | ... |

As shown in Table 1, if the multiple identified user use scenarios include the battery level being insufficient or the surrounding environment being noisy, the intelligent terminal does not perform matching for another policy, and determines that the first presentation mode is the screen presentation, or if the multiple identified user use scenarios do not include the battery level being insufficient or the surrounding environment being noisy, the intelligent terminal performs sequential matching for a policy with a relatively low priority, for example, if the scenario of moving outdoors is identified, it is determined that the first presentation mode is the voice broadcast.

It may be understood that, the preset rule policy may be preset by the intelligent terminal, or may be customized by the user according to an actual case of the user, or the preset rule policy may be generated by collecting, in a machine learning manner, history use information of the user, or a presentation mode that the user chooses to use in a current user use scenario may be recorded, and then a correspondence between the user use scenario and the presentation mode that is chosen to be used may be updated to the preset rule policy, or the preset rule policy may be obtained in another manner, which is not limited herein.

It may be understood that, in some simplified cases, for example, both a quantity of user use scenarios and a quantity of presentation modes are relatively small, the intelligent terminal may also directly determine, according to context data, a presentation mode corresponding to the context data, which is not limited herein.

206 The intelligent terminal presents the content to the user in the first presentation mode.

When the intelligent terminal determines the first presentation mode corresponding to the user use scenario, the intelligent terminal presents the content to the user in the first presentation mode.

When the first presentation mode is a three-dimensional (3D) holographic display, the intelligent terminal may convert a to-be-presented two-dimensional (2D) image into a 3D image, and restore a 3D holographic image by using a built-in slide show program and an optical lens, or when the first presentation mode is projection display, the intelligent terminal may adjust a focal length and a direction of projection, the focal length adjustment is related to a distance between the intelligent terminal and a projection screen, and by means of the direction adjustment, projection may be switched between horizontal or vertical display.

In this embodiment of the present disclosure, when content needs to be presented, an intelligent terminal first presents the content to a user in a second presentation mode, after acquiring context data, determines whether the context data changes compared with context data acquired in a previous acquiring cycle, and if the context data changes, performs a subsequent operation by using the current acquired context data, or if the context data does not change, may acquire the context data again. In this way, the intelligent terminal can update the context data in real time, and provide a presentation mode that is most suitable for a current use scenario of the user to the user.

For ease of understanding, the following describes the content presentation method in this embodiment of the present disclosure by using a specific application scenario.

When an intelligent terminal receives a request for a video call, the intelligent terminal presents content to a user in a screen display manner, the intelligent terminal acquires context data, to obtain information about a surrounding device and location information of the user, the intelligent terminal determines that the context data changes compared with context data acquired last time, the intelligent terminal identifies, according to the context data, that a current use scenario of the user is that it is a static state and there is a surrounding large screen display device, the intelligent terminal determines that a first presentation mode, which corresponds to the user use scenario, of a presentation mode is sending content to a large screen for display, and the intelligent terminal presents the video call to the user in a manner of sending content to a large screen for display.

Figure 3:
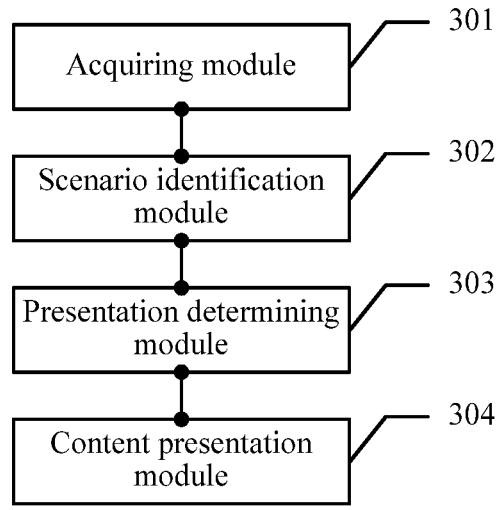
FIG. 3 is a schematic structural diagram of an intelligent terminal according to an embodiment of the present disclosure.

The following describes an intelligent terminal in an embodiment of the present disclosure. Referring to FIG. 3, an embodiment of an intelligent terminal in the embodiments of the present disclosure includes an acquiring module 301 configured to acquire context data of a user, a scenario identification module 302 configured to identify a user use scenario according to the context data acquired by the acquiring module 301, where the user use scenario is used to indicate a scene in which the user currently uses an intelligent device, a presentation determining module 303 configured to determine a first presentation mode, which corresponds to the user use scenario identified by the scenario identification module 302, of a presentation mode, where the presentation mode indicates a content presentation mode, and a content presentation module 304 configured to present content to the user in the first presentation mode determined by the presentation determining module 303.

In this embodiment of the present disclosure, the acquiring module 301 acquires context data of a user, the scenario identification module 302 identifies a user use scenario according to the context data, the presentation determining module 303 determines a first presentation mode corresponding to the user use scenario, and the content presentation module 304 presents content to the user in the first presentation mode. In this way, the intelligent terminal can intelligently present the content to the user in different presentation modes according to different scenarios, thereby meeting a requirement of the user for a content presentation mode in different environments, and the intelligent terminal can identify a current scenario according to the acquired context data, and then directly present the content to the user in the corresponding first presentation mode, thereby reducing operations and a time that are required by the user to acquire information, increasing a rate of acquiring the information, and improving user experience.

Figure 4:
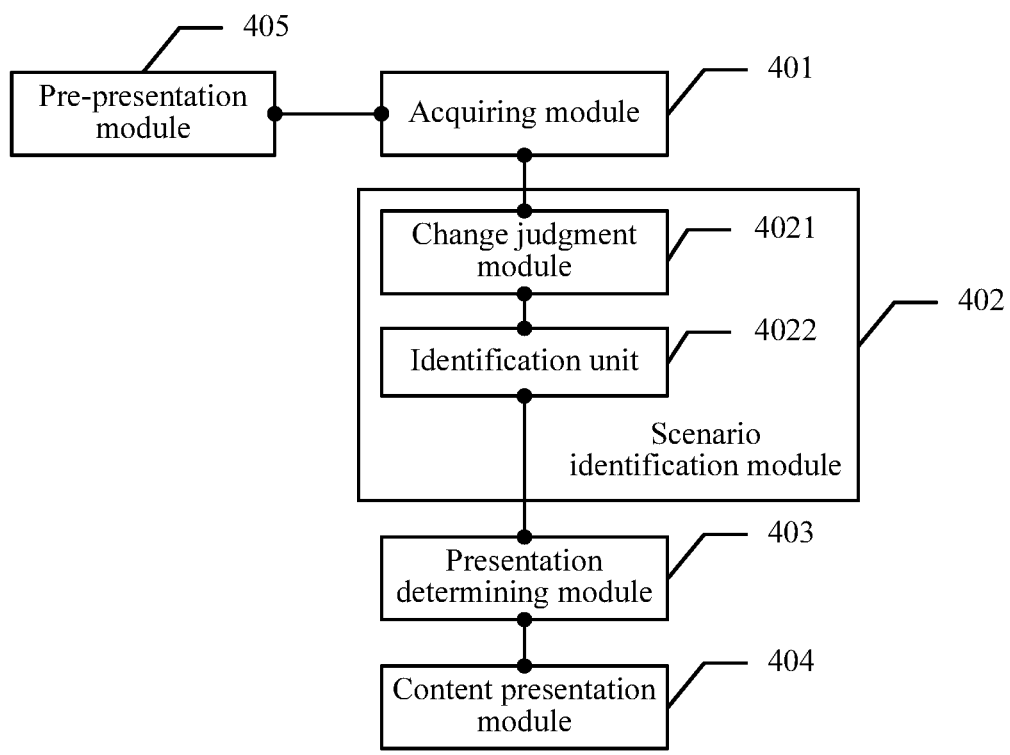
FIG. 4 is another schematic structural diagram of an intelligent terminal according to an embodiment of the present disclosure.

In an actual application, an intelligent terminal may present content to a user in a second presentation mode in advance, and after acquiring context data, determine whether the context data changes compared with context data acquired in a previous acquiring cycle, and then perform a subsequent operation. Referring to FIG. 4, another embodiment of an intelligent terminal in the embodiments of the present disclosure includes an acquiring module 401 configured to acquire context data of a user, a scenario identification module 402 configured to identify a user use scenario according to the context data acquired by the acquiring module 401, where the user use scenario is used to indicate a scene in which the user currently uses an intelligent device, a presentation determining module 403 configured to determine a first presentation mode, which corresponds to the user use scenario identified by the scenario identification module 402, of a presentation mode, where the presentation mode indicates a content presentation mode, and a content presentation module 404 configured to present content to the user in the first presentation mode determined by the presentation determining module 403.

It may be understood that, when content needs to be presented, the intelligent terminal may not present the content to the user in a second presentation mode, in this case, the acquiring module 401 may be configured to when detecting that content needs to be presented, acquire the context data of the user, and the scenario identification module 402 may be configured to search for scenario configuration information, to obtain the user use scenario corresponding to the context data, where the scenario configuration information includes a correspondence between a context data threshold range and the user use scenario.

In this embodiment, the intelligent terminal further includes a pre-presentation module 405 configured to present the content to the user in a second presentation mode, and the scenario identification module 402 includes a change judgment module 4021 configured to determine whether the context data acquired by the acquiring module 401 changes compared with context data acquired in a previous acquiring cycle, and an identification unit 4022 configured to when the change judgment module 4021 determines that the context data changes compared with the context data acquired in the previous acquiring cycle, identify the user use scenario according to the context data acquired by the acquiring module, where the user use scenario is used to indicate the scene in which the user currently uses the intelligent device.

The acquiring module 401 includes a light sensor configured to detect light intensity, and/or a camera configured to detect a surrounding medium available for projection, and/or a microphone configured to detect intensity of use environment noise, and/or a motion sensor configured to detect moving state data of the user, and/or a GPS configured to identify current location information, and/or a battery management unit configured to detect a current battery level.

Figure 5:
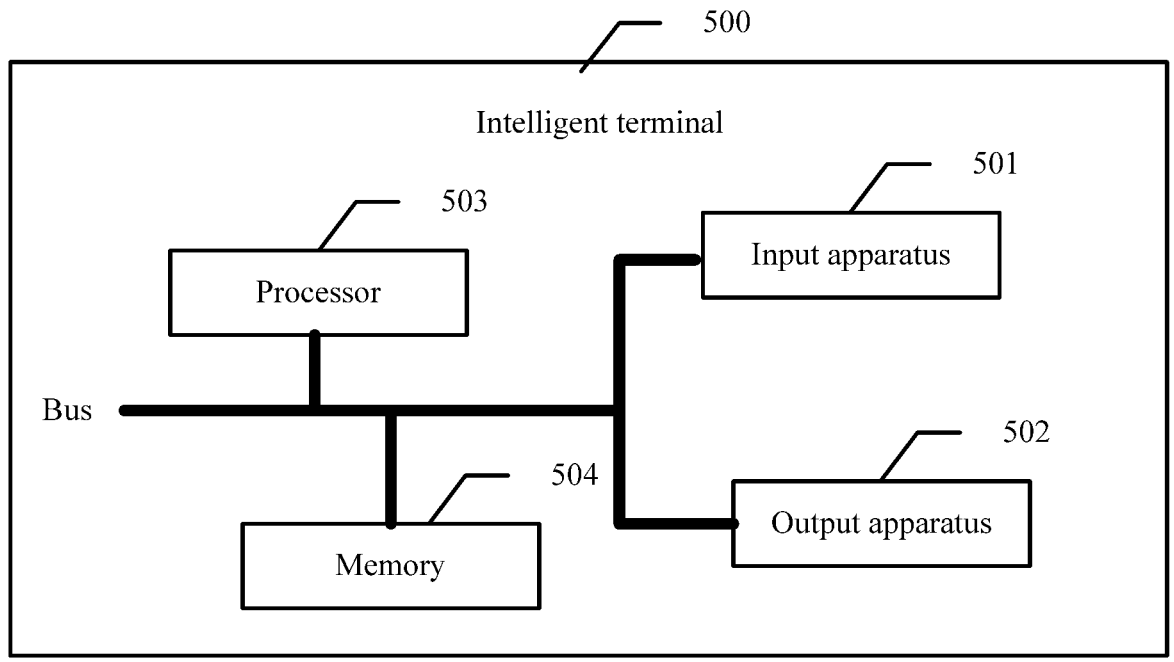
FIG. 5 is another schematic structural diagram of an intelligent terminal according to an embodiment of the present disclosure.

The foregoing describes the intelligent terminal in this embodiment of the present disclosure from the perspective of unitized function entities. The following describes an intelligent terminal in an embodiment of the present disclosure from the perspective of hardware processing. Referring to FIG. 5, another embodiment of an intelligent terminal 500 in the embodiments of the present disclosure includes an input apparatus 501, an output apparatus 502, a processor 503, and a memory 504.

In some embodiments of the present disclosure, the input apparatus 501, the output apparatus 502, the processor 503, and the memory 504 may be connected to by using a bus or in another manner, and a connection by using a bus is used as an example in FIG. 5.

By invoking an operation instruction stored in the memory 504, the processor 503 is configured to perform the following steps acquiring context data of a user, identifying a user use scenario according to the context data, where the user use scenario is used to indicate a scene in which the user currently uses an intelligent device, determining a first presentation mode, which corresponds to the user use scenario, of a presentation mode, where the presentation mode indicates a content presentation mode, and presenting content to the user in the first presentation mode.

In some embodiments of the present disclosure, the processor 503 performs the following step when detecting that content needs to be presented, acquiring the context data of the user.

In some embodiments of the present disclosure, the processor 503 further performs the following steps presenting the content to the user in a second presentation mode, determining whether the context data changes compared with context data acquired in a previous acquiring cycle, and if the context data changes, identifying the user use scenario according to the context data.

In some embodiments of the present disclosure, the processor 503 performs the following steps searching for scenario configuration information, to obtain the user use scenario corresponding to the context data, where the scenario configuration information includes a correspondence between a context data threshold range and the user use scenario.

In some embodiments of the present disclosure, the processor 503 performs the following steps invoking a light sensor to detect light intensity, and/or invoking a camera to detect a surrounding medium available for projection, and/or invoking a microphone to detect intensity of use environment noise, and/or invoking a motion sensor to detect moving state data of the user, and/or invoking a GPS or WiFi to identify current location information, and/or invoking a battery management unit to detect a current battery level.

For ease of understanding the foregoing embodiments, the following provide descriptions by using a process of interaction among modules of the intelligent terminal in a specific application scenario.

When an intelligent terminal receives a request for a video call, a pre-presentation module 405 presents content to a user in a screen display manner, an acquiring module 401 acquires context data, to obtain information about a surrounding device and location information of the user, a change judgment module 4021 determines that the context data changes compared with context data acquired last time, an identification unit 4022 identifies, according to the context data, that a current use scenario of the user is that it is a static state and there is a surrounding large screen display device, a presentation determining module 403 determines that a first presentation mode, which corresponds to the user use scenario, of a presentation mode is sending content to a large screen for display, and a content presentation module 404 presents the video call to the user in a manner of sending content to a large screen for display.

Figure 6:
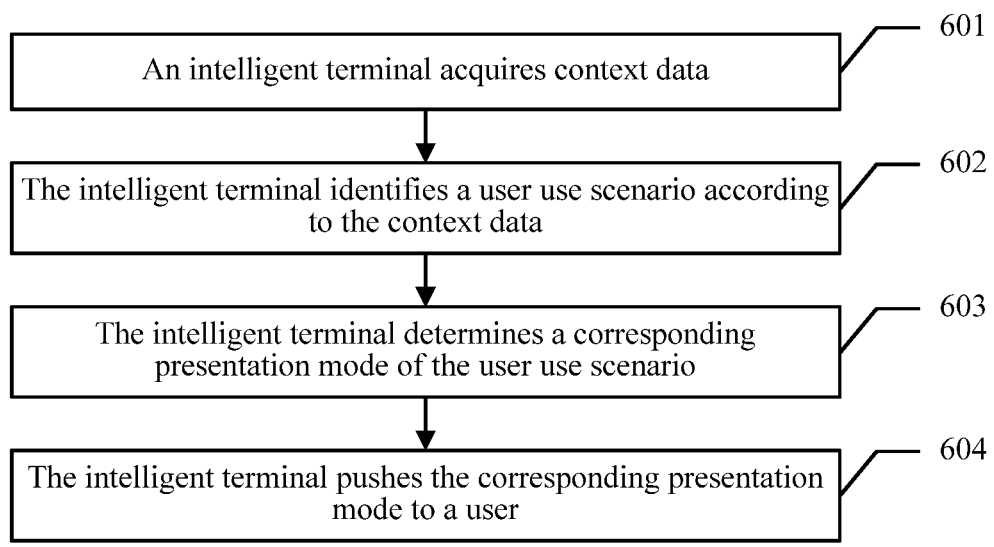
FIG. 6 is a schematic flowchart of a content presentation mode push method according to an embodiment of the present disclosure.

The following describes a content presentation mode push method in an embodiment of the present disclosure. Referring to FIG. 6, an embodiment of a content presentation mode push method in the embodiments of the present disclosure includes:

601: An intelligent terminal acquires context data of a user.

When the intelligent terminal is in a powered-on state, the intelligent terminal can acquire the context data of the user.

602: The intelligent terminal identifies a user use scenario according to the context data.

After acquiring the context data, the intelligent terminal may identify the user use scenario according to the context data, where the user use scenario is used to indicate a scene in which the user currently uses an intelligent device.

603: The intelligent terminal determines a corresponding presentation mode of the user use scenario.

After identifying the user use scenario, the intelligent terminal determines the corresponding presentation mode of the user use scenario, where the corresponding presentation mode includes at least one presentation mode, and the presentation mode indicates a content presentation mode.

604: The intelligent terminal pushes the corresponding presentation mode to the user.

After determining the corresponding presentation mode, the intelligent terminal pushes the corresponding presentation mode to the user, so that the user selects a presentation mode from the pushed corresponding presentation mode to perform content presentation.

In this embodiment of the present disclosure, after determining a corresponding presentation mode according to context data, an intelligent terminal pushes the corresponding presentation mode to a user for selection, so that the user can independently select a required presentation mode from a suitable presentation mode to perform content presentation, thereby improving user experience.

Figure 7:
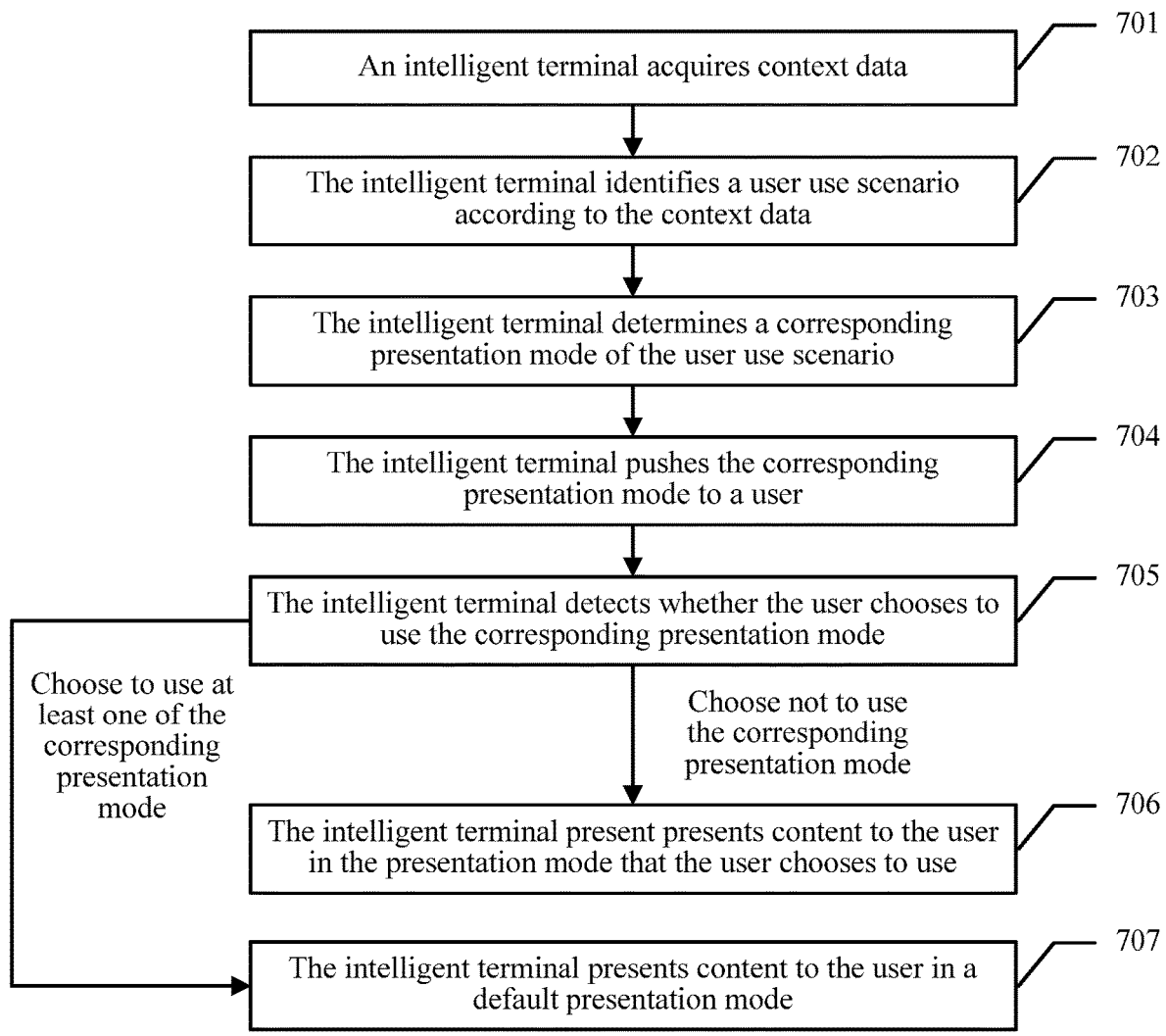
FIG. 7 is another schematic flowchart of a content presentation mode push method according to an embodiment of the present disclosure.

In an actual application, the intelligent terminal may further detect the selection by the user, and perform subsequent processing according to a selection result. Referring to FIG. 7, another embodiment of a content presentation mode push method in the embodiments of the present disclosure includes:

701: An intelligent terminal acquires context data of a user.

When the intelligent terminal is in a powered-on state, the intelligent terminal can acquire the context data of the user.

The context data may also be referred to as context information, and refers to information such as a history record of a location, an action, and a behavior of the user. The context data may be obtained from various pieces of source information, for example, a light sensor may be invoked to detect light intensity, a camera may be invoked to detect a surrounding medium available for projection, a microphone may be invoked to detect intensity of use environment noise, a motion sensor may be invoked to detect moving state data of the user, a GPS or WiFi may be invoked to identify location information of a current user, or a battery management unit may be invoked to detect a current battery level, which is not limited herein.

In summary, the context data reflects some attribute information related to the user.

The intelligent terminal may be set to acquire the context data once at a specific interval, a preset condition may be set to trigger acquisition of the context data, or the context data may be continuously acquired, which is not limited herein.

702: The intelligent terminal identifies a user use scenario according to the context data.

After acquiring the context data, the intelligent terminal may identify the user use scenario according to the context data, where the user use scenario is used to indicate a scene in which the user currently uses an intelligent device.

There are many manners in which the intelligent terminal identifies a user use scenario according to context data. The intelligent terminal may search for scenario configuration information, to obtain a user use scenario corresponding to the context data, where the scenario configuration information includes a correspondence between a context data threshold range and the user use scenario, the intelligent terminal may identify a user use scenario in a machine learning manner, for example, establish a corresponding scenario model M for each scenario A by using a specific quantity of training data sets, including data acquired from a context data source, and a current user use scenario, when a set of data S is acquired from the context data source, S is entered into the model M, and output of M is determining whether the use scenario is the scenario A, and further, by continuously acquiring context data and user use scenario information, the intelligent terminal may learn to update a scenario model, or the intelligent terminal may search for other information, to obtain the user use scenario corresponding to the context data, which is not limited herein.

The user use scenario may include a scenario that can be identified according to the context data, for example, a battery level being insufficient, a surrounding environment being noisy, moving outdoors, or being static outdoors, which is not limited herein.

703: The intelligent terminal determines a corresponding presentation mode of the user use scenario.

After identifying the user use scenario, the intelligent terminal determines the corresponding presentation mode of the user use scenario, where the corresponding presentation mode includes at least one presentation mode, and the presentation mode indicates a content presentation mode.

It should be noted that, the presentation mode may include a mode that can be used to present content, such as screen switching, switching to large screen display, projection display, holographic display, and voice broadcast, which is not limited herein.

There are multiple methods for the intelligent terminal to determine a corresponding presentation mode of a user use scenario. The intelligent terminal may search a preset rule policy, to obtain the corresponding presentation mode of the user use scenario, where the preset rule policy is used to indicate a correspondence between the user use scenario and the presentation mode.

There may be multiple user use scenarios that are determined by the intelligent terminal according to context data. Policies in the preset rule policy may have different priorities. The intelligent terminal performs sequential matching between multiple identified user use scenarios and the preset rule policy according to the priorities in sequence. Sequences of priorities of matching presentation modes are used as sequences of display in corresponding presentation modes. A preset rule policy shown in Table 1 is used as an example, where a policy with a relatively small sequence number has a relatively high priority.

As shown in Table 1, if the multiple identified user use scenarios include the battery level being insufficient or the surrounding environment being noisy, and are states of moving outdoors, the intelligent terminal sequentially pushes corresponding presentation modes being screen display and voice broadcast.

In addition, after step 705, that is, the intelligent terminal detects the presentation mode that the user chooses to use, the intelligent terminal may record the presentation mode that the user chooses to use in the user use scenario, and then update, to the preset rule policy, a correspondence between the user use scenario and the presentation mode that is chosen to be used, or the preset rule policy may be obtained in another manner, which is not limited herein.

It may be understood that, in some simplified cases, for example, both a quantity of user use scenarios and a quantity of presentation modes are relatively small, the intelligent terminal may also directly determine a corresponding presentation mode of context data according to the context data, which is not limited herein.

704: The intelligent terminal pushes the corresponding presentation mode to the user.

After determining the corresponding presentation mode, the intelligent terminal pushes the corresponding presentation mode to the user, so that the user selects a presentation mode from the pushed corresponding presentation mode to perform content presentation.

705: The intelligent terminal detects whether the user chooses to use the corresponding presentation mode.

After pushing the corresponding presentation mode to the user, the intelligent terminal detects whether the user chooses to use the corresponding presentation mode, and if the user chooses to use at least one presentation mode of the corresponding presentation mode, step 706 is triggered, or if the user chooses not to use the corresponding presentation mode, step 707 is triggered.

The intelligent terminal receives a selection operation by the user in multiple manners. A selection of the user may be determined by identifying a language of the user, or a selection of the user may be received by means of a pushbutton or a touchscreen, which is not limited herein.

706: The intelligent terminal presents content to the user in the presentation mode that the user chooses to use.

When the user chooses to use the at least one presentation mode of the corresponding presentation mode, the intelligent terminal presents the content to the user in the presentation mode that the user chooses to use.

707: The intelligent terminal presents content to the user in a default presentation mode.

When the user chooses not to use the corresponding presentation mode, the intelligent terminal presents the content to the user in the default presentation mode.

It may be understood that, the default presentation mode may be customized by the user, or may be preset before delivery, which is not limited herein.

In this embodiment of the present disclosure, an intelligent terminal detects a presentation mode that a user chooses to use in a current user use scenario, and updates a correspondence between the user use scenario and the presentation mode to a preset rule policy, so that the corresponding presentation mode determined by the intelligent terminal can better meet a requirement of the user for a presentation mode.

For ease of understanding, the following describes the content presentation mode push method in this embodiment of the present disclosure by using a specific application scenario After an intelligent terminal receives a short message service message, the intelligent terminal acquires context data, to obtain location information of a user and intensity of surrounding noise, the intelligent terminal identifies, according to the context data, that a user use scenario is moving and a surrounding environment being quiet, the intelligent terminal determines a corresponding presentation mode (1. voice broadcast, and 2. projection display) of the user use scenario, the intelligent terminal pushes the corresponding presentation mode (1. voice broadcast, and 2. projection display) to the user, the intelligent terminal detects that the user selects a manner of the voice broadcast, and the intelligent terminal plays content of the received short message service message to the user in the manner of the voice broadcast.

Figure 8:
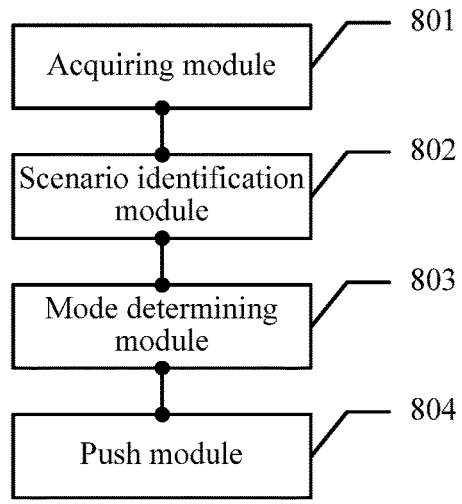
FIG. 8 is another schematic structural diagram of an intelligent terminal according to an embodiment of the present disclosure.

The following describes an intelligent terminal in an embodiment of the present disclosure. Referring to FIG. 8, another embodiment of an intelligent terminal in the embodiments of the present disclosure includes an acquiring module 801 configured to acquire context data of a user, a scenario identification module 802 configured to identify a user use scenario according to the context data acquired by the acquiring module 801, where the user use scenario is used to indicate a scene in which the user currently uses an intelligent device, a mode determining module 803 configured to determine a corresponding presentation mode of the user use scenario, where the corresponding presentation mode includes at least one presentation mode, and the presentation mode indicates a content presentation mode, and a push module 804 configured to push the corresponding presentation mode to the user, so that the user selects a presentation mode from the pushed corresponding presentation mode to perform content presentation.

In this embodiment of the present disclosure, after the scenario identification module 802 and the mode determining module 803 determine a corresponding presentation mode according to context data, the push module 804 pushes the corresponding presentation mode to a user for selection, so that the user can independently select a required presentation mode from a suitable presentation mode to perform content presentation, thereby improving user experience.

Figure 9:
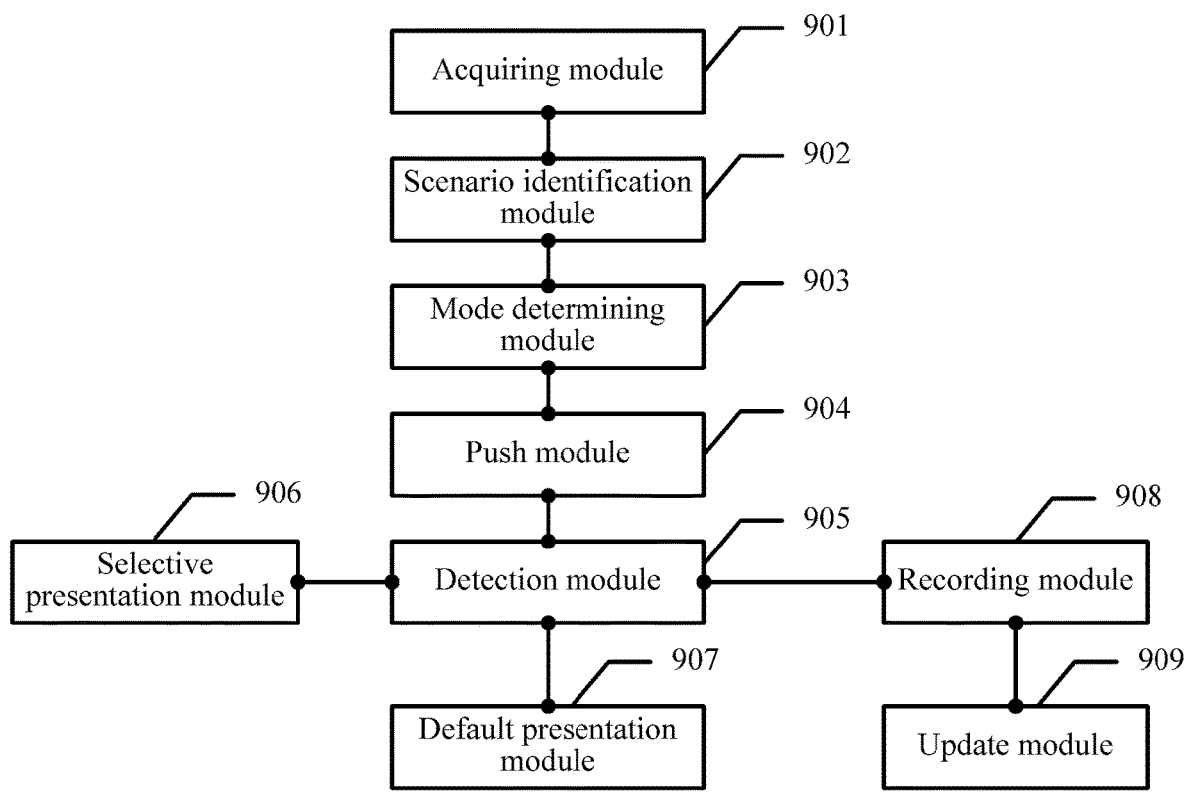
FIG. 9 is another schematic structural diagram of an intelligent terminal according to an embodiment of the present disclosure.

In an actual application, the intelligent terminal may further detect the selection by the user, and perform subsequent processing according to a selection result. Referring to FIG. 9, another embodiment of an intelligent terminal in the embodiments of the present disclosure includes an acquiring module 901 configured to acquire context data of a user, a scenario identification module 902 configured to identify a user use scenario according to the context data acquired by the acquiring module 901, where the user use scenario is used to indicate a scene in which the user currently uses an intelligent device, a mode determining module 903 configured to determine a corresponding presentation mode of the user use scenario, where the corresponding presentation mode includes at least one presentation mode, and the presentation mode indicates a content presentation mode, and a push module 904 configured to push the corresponding presentation mode to the user, so that the user selects a presentation mode from the pushed corresponding presentation mode to perform content presentation.

In this embodiment, the intelligent terminal further includes a detection module 905 configured to detect whether the user chooses to use the corresponding presentation mode, a selective presentation module 906 configured to when the user chooses to use at least one presentation mode of the corresponding presentation mode, present content to the user in the presentation mode that the user chooses to use, and a default presentation module 907 configured to when the user chooses not to use the corresponding presentation mode, present content to the user in a default presentation mode.

The mode determining module 903 may be configured to search a preset rule policy, to obtain the corresponding presentation mode of the user use scenario, where the preset rule policy is used to indicate a correspondence between the user use scenario and the presentation mode, the corresponding presentation mode includes the at least one presentation mode, and the presentation mode indicates the content presentation mode.

The intelligent terminal may further include a recording module 908 configured to record the presentation mode that the user chooses to use in the user use scenario, and an update module 909 configured to update, to the preset rule policy, a correspondence between the user use scenario and the presentation mode that is recorded by the recording module 908 and that the user chooses to use.

In this embodiment of the present disclosure, the detection module 905 detects a presentation mode that a user chooses to use in a current user use scenario, and the update module 909 updates a correspondence between the user use scenario and the presentation mode to a preset rule policy, so that the corresponding presentation mode determined by the intelligent terminal can better meet a requirement of the user for a presentation mode.

For ease of understanding the foregoing embodiments, the following provide descriptions by using a process of interaction among modules of the intelligent terminal in a specific application scenario:

After an intelligent terminal receives a short message service message, an acquiring module 901 acquires context data, to obtain location information of a user and intensity of surrounding noise, a scenario identification module 902 identifies, according to the context data, that a user use scenario is moving and a surrounding environment being quiet, a mode determining module 903 determines a corresponding presentation mode (1. voice broadcast, and 2. projection display) of the user use scenario, a push module 904 pushes the corresponding presentation mode (1. voice broadcast, and 2. projection display) to the user, a detection module 905 detects that the user selects a manner of the voice broadcast, and the intelligent terminal plays content of the received short message service message to the user in the manner of the voice broadcast.

The foregoing describes the intelligent terminal in this embodiment of the present disclosure from the perspective of unitized function entities. The following describes an intelligent terminal in an embodiment of the present disclosure from the perspective of hardware processing. Referring to FIG. 5, another embodiment of an intelligent terminal 500 in the embodiments of the present disclosure includes an input apparatus 501, an output apparatus 502, a processor 503, and a memory 504.

In some embodiments of the present disclosure, the input apparatus 501, the output apparatus 502, the processor 503, and the memory 504 may be connected to by using a bus or in another manner, and a connection by using a bus is used as an example in FIG. 5.

By invoking an operation instruction stored in the memory 504, the processor 503 is configured to perform the following steps acquiring context data of a user, identifying a user use scenario according to the context data, where the user use scenario is used to indicate a scene in which the user currently uses an intelligent device, determining a corresponding presentation mode of the user use scenario, where the corresponding presentation mode includes at least one presentation mode, and the presentation mode indicates a content presentation mode, and pushing the corresponding presentation mode to the user, so that the user selects a presentation mode from the pushed corresponding presentation mode to perform content presentation.

In some embodiments of the present disclosure, the processor 503 is further configured to perform the following steps detecting whether the user chooses to use the corresponding presentation mode, and when the user chooses to use at least one presentation mode of the corresponding presentation mode, presenting content to the user in the presentation mode that the user chooses to use, or when the user chooses not to use the corresponding presentation mode, presenting the content to the user in a default presentation mode.

In some embodiments of the present disclosure, the processor 503 performs the following steps searching for a preset rule policy, to obtain the corresponding presentation mode of the user use scenario, where the preset rule policy is used to indicate a correspondence between the user use scenario and the presentation mode.

In some embodiments of the present disclosure, the processor 503 further performs the following steps recording the presentation mode that the user chooses to use in the user use scenario, and updating, to the preset rule policy, a correspondence between the user use scenario and the presentation mode that the user chooses to use.

Figure 10:
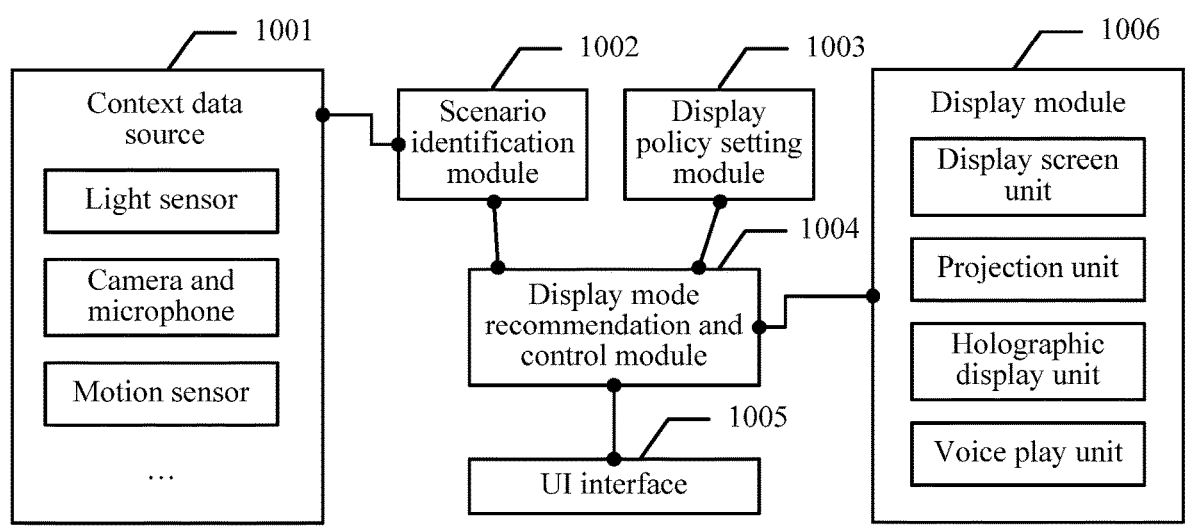
FIG. 10 is another schematic structural diagram of an intelligent terminal according to an embodiment of the present disclosure.

Referring to FIG. 10, another embodiment of an intelligent terminal in the embodiments of the present disclosure includes a context data source 1001, a scenario identification module 1002, a display policy setting module 1003, a display mode recommendation and control module 1004, a user interface (UI) 1005, and a display module 1006.

The context data source 1001 is configured to detect various types of context information in a current use scenario, and includes a light sensor configured to detect light intensity, a camera configured to detect a surrounding medium available for projection, a microphone configured to detect whether a use environment is noisy, a motion sensor configured to detect whether a user moves, a GPS, WiFi, or the like configured to identify current location information, such as indoors or outdoors, another detection device, which, for example, identifies whether there is a surrounding large screen display apparatus available, and a battery management unit configured to detect a status of a current battery level.

The scenario identification module 1002 is configured to identify a current user use scenario according to various types of context parameters that are detected by the context data source. The user use scenario may include two parts: environment information (for example, indoors/outdoors, location information, a noise level of a surrounding environment, whether a medium available for projection is detected in the surrounding environment, whether a large screen display apparatus exists in the surrounding environment) and a behavior state of the user (for example, whether the user is moving).

For example, the scenario identification module 1002 may identify a use scenario of a user from the following dimensions, as shown in Table 2.

TABLE 2

| Sequence number | Scenario dimension |
|---|---|
| 1 | Battery level (sufficient/insufficient) |
| 2 | Environment volume (quiet/noisy) |
| 3 | User moving/being static |
| 4 | Indoors/outdoors |

TABLE 2-continued

| Sequence number | Scenario dimension |
|---|---|
| 5 | Indoor environment: whether there is a surrounding large screen display apparatus available/whether there is a surrounding medium available for projection |

The use scenario of the user may be identified in a conventional rule matching manner, which is implemented by defining a configuration file in advance, and stipulating a correspondence between a preset scenario and a threshold range of a detected context parameter.

In one embodiment, the use scenario of the user may be identified in a machine learning manner, where a scenario model M is established for each scenario A by using a specific quantity of training data sets, including data acquired by the context data source and a scenario notation, at that time, of the user, when the context data source acquires a set of data S, S is entered into the model M, and output of M is determining whether the use scenario is the scenario A. Further, by using continuously acquired context data and scenario notation information, a system can learn to update a scenario model, thereby increasing accuracy of identifying a use scenario.

The display policy setting module 1003 is configured to set and store correspondences between user use scenarios and intelligent terminal display modes. In an initial condition, the system provides a default display policy setting, and additionally, the user may modify and update a display policy according to a requirement and a preference of the user by using input of the policy setting module. In addition, by using a display mode selection that is currently fed back by the user and that is recorded by the display mode recommendation and control module 1004, the display policy setting module 1003 updates and adjusts a display mode corresponding to a currently identified scenario to a corresponding display mode that is fed back and selected by the user.

Table 1 shows some possible examples of display policies. Table 1 includes eight definitions of display mode policies, where a policy with a relatively small sequence number has a relatively high priority. When identifying multiple use scenarios, the system performs sequential matching between the multiple identified scenarios and a display policy table in sequence according to sequence numbers of the display policies. When one scenario thereof succeeds in matching, a corresponding display mode recommended by the system can be obtained.

As shown in Table 1, in cases of the battery level being insufficient and the surrounding environment being noisy, a scenario identified according to other context is temporarily not considered, and a screen display mode is preferentially considered. Another display policy is considered only when the foregoing use scenarios do not exist, for example, when it is detected that a user is moving outdoors, a presentation mode of voice broadcast is used, or if it is detected that a user is in a static state outdoors, a screen presentation mode is used. When a scenario in which a user is indoors is detected, whether there is an available large screen display device in a surrounding environment is preferentially determined. If the device exists, an intelligent terminal sends to-be-presented content to the large screen display device for presentation to bring relatively good visual experience to the user. If the device does not exist, whether the user is in a moving state is determined. If the user is in the moving state, content presentation is performed in a manner of voice broadcast. If the user is static, whether there is a surrounding projection medium available (such as a desk or a wall) is further determined. If there is the medium, presentation is performed in a projection manner, otherwise, content is presented in a 3D holographic display manner.

The display mode recommendation and control module 1004 performs, according to the display policy stored in the display policy setting module 1003, matching between the current user use scenario identified by the scenario identification module 1002 and the display policy according to matching priorities, selects a display mode corresponding to the current use scenario as a preferred display manner, presents and recommends the preferred display manner to the user by using the UI 1005, and controls, according to information that is received by the UI and that is about whether the recommended display mode is used for a user feedback, a corresponding display unit in the display module 1006 to present content.

In one embodiment, when there is only one recommended display mode, an intelligent terminal prompts, to a user in a voice manner, an available display mode that is currently recommended, and inquires a user whether to present content in the mode, or when there are multiple recommended display modes, an intelligent terminal presents all recommended display modes to a user in a manner of screen display, and receives a selection of the user.

In one embodiment, the display mode recommendation and control module 1004 may provide multiple display modes simultaneously that are currently available and that are obtained by a user by performing matching between a context and a display policy, perform presentation according to a specific priority, for the user to select a most suitable display mode to display to-be-presented content, and send a selection, which is fed back by the user, to the policy setting module 1003, to update a display policy corresponding to a currently identified scenario. In a case in which multiple display modes are recommended, a preferred UI is a selection interface of a touchscreen.

The UI 1005 is used for interaction between an intelligent terminal and a user. An optional UI manner includes a voice command manner, a touchscreen manner, a manner of selection by means of a pushbutton, or the like. Preferably, an intelligent terminal prompts, to a user in a voice manner, an available display mode that is currently recommended, inquires the user whether to present content in the mode, and receives, identifies, and parses a voice command of the user, or acquires feedback information of the user by receiving a selection by means of a pushbutton or a touchscreen.

The display module 1006 includes at least two display units of a display screen unit, a projection unit, a holographic display unit, and a voice play unit.

The 3D holographic display unit converts a to-be-presented 2D image into a 3D image by using a holographic image processing program, and restores a 3D holographic image by using a built-in slide show program and an optical lens, so that the user obtains more real liveness.

In addition, the projection unit may further adjust a focal length and a direction of projection, and the focal length adjustment is related to a distance between a cell phone and a projection screen. By means of the focal length adjustment, a clearest image can be obtained at any distance within a projection range. By means of the direction adjustment, projection may be switched between horizontal or vertical display.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A content presentation method, comprising:
storing, by an intelligent terminal, a plurality of preset rule policies indicating an association between a plurality of user use scenarios and a plurality of presentation modes;
causing, by the intelligent terminal, content to be displayed to the user in a second presentation mode;
acquiring, by the intelligent terminal, context data of the intelligent terminal after causing the content to be displayed, wherein the context data is associated with at least one of an environment around the intelligent terminal or a status of the intelligent terminal;
identifying, by the intelligent terminal, a plurality of user use scenario scenarios according to the context data by:
searching for scenario configuration information, wherein the scenario configuration information comprises a correspondence between a context data threshold range and the user use scenario;
determining whether the context data changes compared with context data acquired previously; and
identifying the plurality of user use scenarios according to the context data based on the scenario configuration and based on whether the context data changes compared with the context data acquired previously, wherein each of the plurality of user use scenarios indicates a scene in which the user currently uses an intelligent device;
matching, by the intelligent terminal, each of the plurality of user use scenarios to a preset rule policy, wherein the preset rule policy indicates an association between a user use scenario and a presentation mode indicating a mode of presenting the content to the user;
storing, by the intelligent terminal, a plurality of preset rule policies that are ordered according to a priority associated with each of the plurality of preset rule policies;
determining, by the intelligent terminal, the priority for the preset rule policy corresponding to each of the plurality of user use scenarios;
selecting, by the intelligent terminal, the presentation mode corresponding to the preset rule policy having a highest priority after determining the priority for the preset rule policy corresponding to each of the plurality of user use scenarios, wherein the presentation mode is determined in response to receiving a selection of the presentation mode from the user; and
causing, by the intelligent terminal, the content to be displayed to the user in the presentation mode.

2. The method according to claim 1, wherein acquiring context data comprises at least one of:
invoking a light sensor to detect light intensity,
invoking a camera to detect a surrounding medium available for projection,
invoking a microphone to detect intensity of environment noise,
invoking a motion sensor to detect moving state data of the user,
invoking a global positioning system (GPS),
invoking a Wireless Fidelity (WiFi) to identify current location information, and
invoking a battery management unit to detect a current battery level.

3. An intelligent terminal, comprising:
a memory comprising instructions and configured to store a plurality of preset rule policies indicating an association between a plurality of user use scenarios and a plurality of presentation modes; and
a processor coupled to the memory and configured to execute the instructions to:
cause content to be displayed to the user in a second presentation mode;
acquire context data of the intelligent terminal after causing the content to be displayed, wherein the context data is associated with at least one of an environment around the intelligent terminal or a status of the intelligent terminal;

identify a plurality of user use scenarios according to the context data, wherein to identify the plurality of user use scenarios, the processor executes the instructions to:

search for scenario configuration information, wherein the scenario configuration information comprises a correspondence between a context data threshold range and the user use scenario;

determine whether the context data changes compared with context data acquired previously; and identify the plurality of user use scenarios according to the context data based on the scenario configuration and based on whether the context data changes compared with the context data acquired previously, wherein each of the plurality of user use scenarios indicates a scene in which the user currently uses the intelligent device;

match each of the plurality of user use scenarios to a preset rule policy, wherein the preset rule policy indicates an association between a user use scenario and a presentation mode indicating a mode of presenting content to the user;

store a plurality of preset rule policies that are ordered according to a priority associated with each of the plurality of preset rule policies;

determine the priority for the preset rule policy corresponding to each of the plurality of user use scenarios;

select the presentation mode corresponding to the preset rule policy having a highest priority after determining the priority for the preset rule policy corresponding to each of the plurality of user use scenarios, wherein the presentation mode is determined in response to receiving a selection of the presentation mode from the user; and cause the content to be displayed to the user in the presentation mode.

4. The intelligent terminal of claim 3, wherein the context data is acquired from at least one of a light sensor, a camera, a microphone, a motion sensor, a global positioning system (GPS), a Wireless Fidelity (WiFi), or a battery management unit.

5. A non-transitory computer readable medium configured to store a computer program product comprising computer executable instructions that when executed by a processor of an intelligent terminal cause the processor to:

store a plurality of preset rule policies indicating an association between a plurality of user use scenarios and a plurality of presentation modes, wherein the preset rule policies are ordered according to a priority associated with each of the plurality of preset rule policies;

cause content to be displayed to the user in a second presentation mode;

acquire context data of the intelligent terminal after causing the content to be displayed, wherein the context data is associated with at least one of an environment around the intelligent terminal or a status of the intelligent terminal;

identify a plurality of user use scenarios according to the context data, wherein to identify the plurality of user use scenarios, the computer executable instructions further cause the processor to:

search for scenario configuration information, wherein the scenario configuration information comprises a correspondence between a context data threshold range and the user use scenario;

determine whether the context data changes compared with context data acquired previously; and identify the plurality of user use scenarios according to the context data based on the scenario configuration and based on whether the context data changes compared with the context data acquired previously, wherein each of the plurality of user use scenarios indicates a scene in which the user currently uses the intelligent device;

match each of the plurality of user use scenarios to a preset rule policy, wherein the preset rule policy indicates an association between a user use scenario and a presentation mode indicating a mode of presenting content to the user;

determine the priority for the preset rule policy corresponding to each of the plurality of user use scenarios;

select the presentation mode indicating a mode of presenting content to the user based on a preset rule policy indicating an association between the user use scenario and the presentation mode and a priority associated with the preset rule policy corresponding to the preset rule policy having a highest priority after determining the priority for the preset rule policy corresponding to each of the plurality of user use scenarios, wherein the presentation mode is determined in response to receiving a selection of the presentation mode from the user; and cause the content to be displayed to the user in the presentation mode.

6. The non-transitory computer readable medium of claim 5, wherein the computer executable instructions that when executed by the processor further cause the processor to record the presentation mode that the user selects to use in the user use scenario.

7. The non-transitory computer readable medium of claim 5, wherein the computer executable instructions that when executed by the processor further cause the processor to update a correspondence between the user use scenario selected and the presentation mode that the user selects to use.

8. The non-transitory computer readable medium of claim 5, wherein the context data is acquired from at least one of a light sensor, a camera, a microphone, a motion sensor, a global positioning system (GPS), a Wireless Fidelity (WiFi), or a battery management unit.

* * * * *